(12) United States Patent
Shinohara et al.

(10) Patent No.: US 7,446,825 B2
(45) Date of Patent: Nov. 4, 2008

(54) BACKLIGHT UNIT, DISPLAY DEVICE PROVIDED WITH THE BACKLIGHT UNIT, AND METHOD OF MANUFACTURING THE DISPLAY DEVICE

(75) Inventors: Toshiya Shinohara, Kanagawa (JP); Chouei Sugitani, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 285 days.

(21) Appl. No.: 11/490,119

(22) Filed: Jul. 21, 2006

(65) Prior Publication Data
US 2007/0024771 A1 Feb. 1, 2007

(30) Foreign Application Priority Data
Jul. 27, 2005 (JP) .............................. 2005-216776

(51) Int. Cl.
*G02F 1/1333* (2006.01)
*G02F 1/1335* (2006.01)
*G02F 1/13* (2006.01)

(52) U.S. Cl. ............................. 349/58; 349/61; 349/187

(58) Field of Classification Search ................... 349/61, 349/56, 58, 63, 67, 113, 116, 122, 138, 187, 349/189, 190, 150
See application file for complete search history.

(56) References Cited

U.S. PATENT DOCUMENTS

| | | | | |
|---|---|---|---|---|
| 5,489,999 | A | 2/1996 | Matsumoto | ................... 349/49 |
| 5,838,400 | A * | 11/1998 | Ueda et al. | ..................... 349/58 |
| 7,038,741 | B2 * | 5/2006 | Lai et al. | ....................... 349/58 |
| 2004/0114062 | A1 | 6/2004 | Nishio et al. | .................. 349/58 |
| 2005/0024573 | A1 | 2/2005 | Suzuki | ....................... 349/149 |
| 2007/0024771 | A1 * | 2/2007 | Shinohara et al. | ............. 349/58 |

FOREIGN PATENT DOCUMENTS

| | | | | |
|---|---|---|---|---|
| JP | 2002-333606 | 11/2002 | ............... | 349/58 X |
| JP | 2005-49774 | 2/2005 | ............... | 349/58 X |

OTHER PUBLICATIONS

Chinese Office Action dated Jan. 18, 2008, with English-language translation.

* cited by examiner

*Primary Examiner*—Brian M Healy
(74) *Attorney, Agent, or Firm*—McGinn IP Law Group, PLLC

(57) ABSTRACT

Disclosed is a backlight unit, including: a case having a frame shape; a light guide plate fixed to the case; a light source located on the side of the light guide plate; a reflective sheet located on the rear of the light guide plate; an EMI protection sheet for covering at least a flexible board located on the rear of the reflective sheet; and a protective sheet located between the reflective sheet and the flexible board, for preventing deformation of the reflective sheet, wherein the EMI protection sheet is bonded to the flexible board and the protective sheet, whereby the flexible board is fixed to the protective sheet.

18 Claims, 11 Drawing Sheets

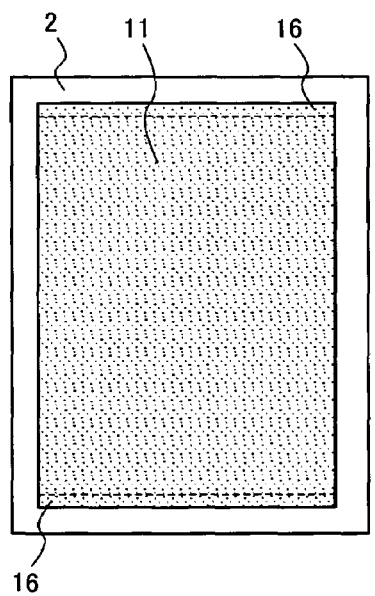
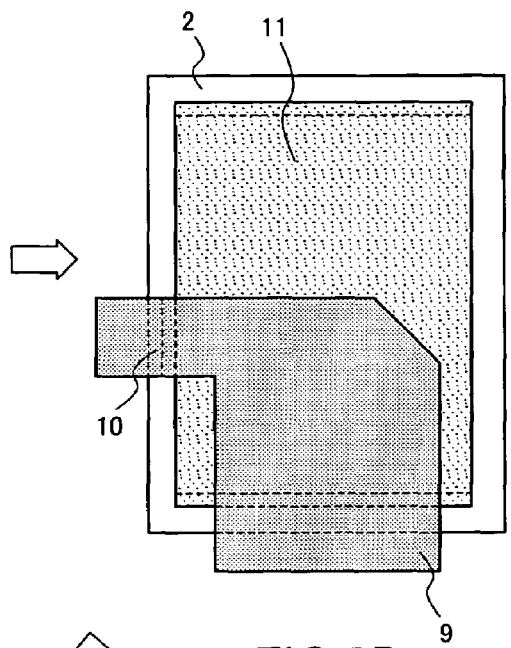
FIG.2A
(RELATED ART)
FIG.2B
(RELATED ART)
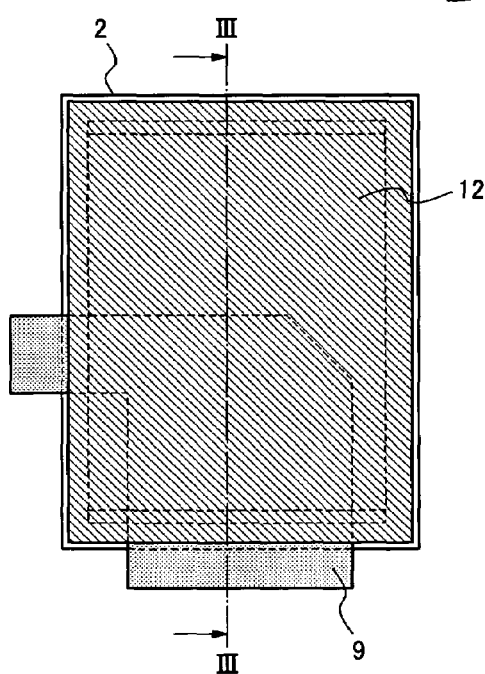
FIG.2C
(RELATED ART)

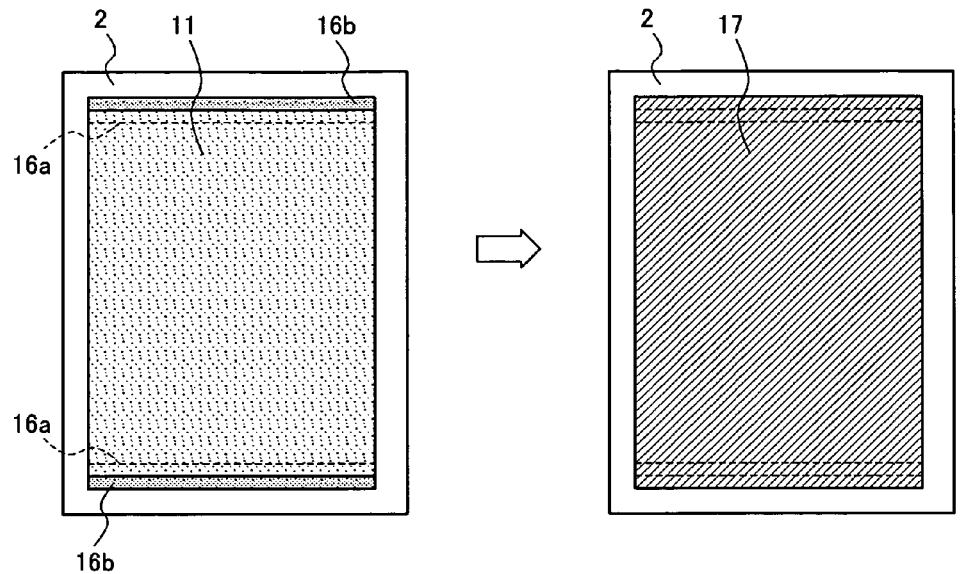
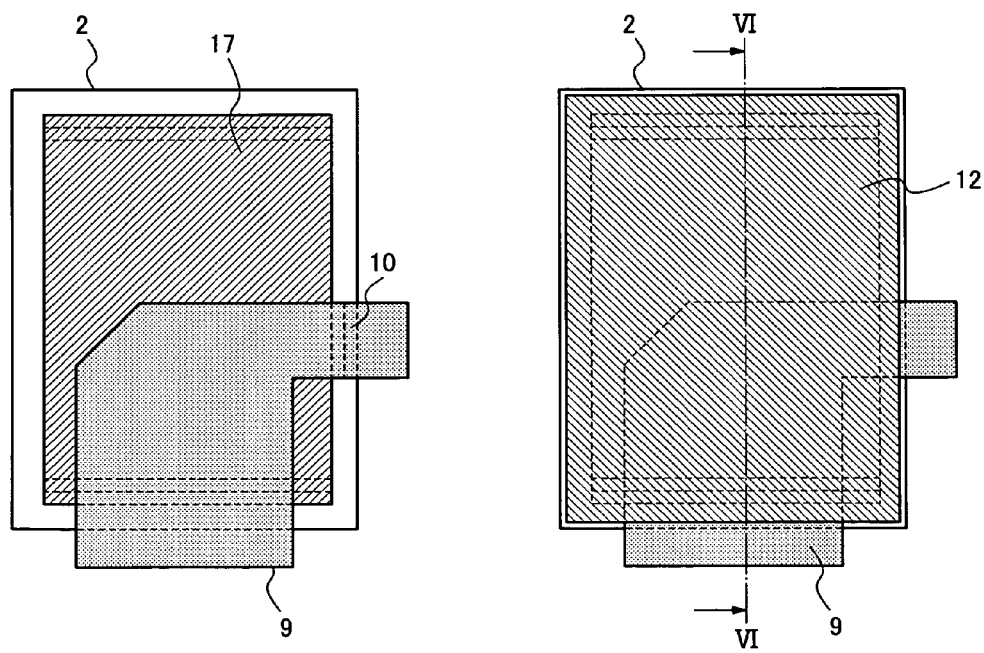
FIG.5A  FIG.5B  FIG.5C  FIG.5D

BACKLIGHT UNIT, DISPLAY DEVICE PROVIDED WITH THE BACKLIGHT UNIT, AND METHOD OF MANUFACTURING THE DISPLAY DEVICE

BACKGROUND OF THE INVENTION

1. Field of the Invention

The present invention relates to a backlight unit used for a display device, a display device provided with the backlight unit, and a method of manufacturing the display device.

2. Description of the Related Art

A display device, particularly, a liquid crystal display device has been widely used as, for example, a monitor of OA (Office Automation) equipment or a monitor of a television unit in view of features such as a small size, a thin type, and low power consumption. The liquid crystal display device includes: a liquid crystal panel in which a liquid crystal layer is sandwiched between opposed transparent substrates; and a backlight unit for generating backlight to illuminate the liquid crystal panel.

Known backlight units include a direct light type, an edge light type, and a surface light source type. The direct light type is a type for reflecting light emitted from a light source located on the rear surface of the liquid crystal panel, using a reflecting plate. The edge light type is also called a side light type which is a type for guiding light emitted from a light source located on the side surface of the liquid crystal panel to the entire rear surface of the liquid crystal panel, using a light guide plate. The surface light source type is a type for illuminating the entire rear surface of the liquid crystal panel with light from a surface light source located on the entire rear surface side. A thin type liquid crystal display device normally employs the edge light type.

A conventional liquid crystal display device including a backlight unit of the edge light system will be described with reference to FIG. 1. FIG. 1 is a perspective view showing a conventional liquid crystal display device disassembled into respective constituent parts.

A liquid crystal display device 1a shown in FIG. 1 includes a liquid crystal panel 8 and a backlight unit 51 of the edge light type. Principal constituent parts of the backlight unit 51 are a light source member 60, a frame-shaped case 2, a light guide plate 3, an optical member 70, and a reflecting member 81.

The liquid crystal panel 8 is provided with a flexible printed circuit (hereinafter, referred to as an FPC) 9 connected with an external circuit board such as a control circuit board. When the liquid crystal panel 8 is bonded to the backlight unit 51 through a double-faced adhesive tape to assemble the liquid crystal display device 1a, as shown by an arrow A, the FPC 9 is folded to a rear surface side (surface opposed to a display surface) of the backlight unit 51. It is to be noted here that a connecting means in which circuits and wirings are formed on a flexible base is collectively referred to as the FPC in the present invention.

The case 2 has a frame shape to hold and fix the respective constituent members. The light source member 60 is composed of light. sources 14 such as LEDs, an FPC 13 on which a control circuit for the light sources 14 is formed, and a double-faced adhesive tape 15 for fixing the light sources 14 and the FPC 13. The light source member 60 is located on a side surface of the light guide plate 3. The light guide plate 3 is fixed in the frame of the case 2 to guide light generated from the light source member 60.

The optical member 70 is located on a surface side (liquid crystal panel 8 side) of the light guide plate 3 to convert light from the light guide plate 3 into uniform light and to irradiate the liquid crystal panel 8 with the uniform light. The optical member 70 is composed of a diffusing sheet 4, a first lens sheet 5a, a second lens sheet 5b, and a polarizing sheet 6.

The diffusing sheet 4 diffuses light outputted from the light guide plate 3 to the liquid crystal panel 8. The first lens sheet 5a and the second lens sheet 5b focus the diffused light on each pixel of the liquid crystal panel 8. The polarizing sheet 6 polarizes the focused light.

A reflecting member 81 is located on a rear surface side (side opposed to the liquid crystal panel 8) of the light guide plate 3 to reflect light outputted from the light guide plate 3 to the rear surface side thereof, thereby returning the light to the light guide plate 3. The reflecting member 81 is composed of a reflective sheet 11, an electromagnetic interference (EMI) protection sheet 12, and double-faced adhesive tapes 16 for fixation.

The reflective sheet 11 reflects, to the light guide plate 3, light outputted from the rear surface of the light guide plate 3. The EMI protection sheet 12 is a sheet for covering the FPC 9 folded to a rear surface of the reflective sheet 11. For example, the FPC 9 is folded to the backlight unit side and located on the rear surface of the reflective sheet 11. However, the FPC 9 easily emits an electromagnetic wave, so EMI protection is necessary.

With respect to an example of the EMI protection, Japanese Patent Laid-Open Publication JP 2002-333606A (U.S. counterpart thereof is U.S. patent application publication US 2004/0114062 A1) discloses a liquid crystal display device using an FPC with which a metal film for EMI protection is integrally formed in advance.

As described above, when the FPC with which the metal film for EMI protection is integrally formed in advance is used, the influence of the electromagnetic wave can be suppressed. However, the FPC which is a specific circuit is expensive, so an increase in cost of the liquid crystal display device occurs. Therefore, the structure in which the EMI protection sheet 12 is located on a rear surface of the reflective sheet 11 is normally used as shown in FIG. 1 to protect the FPC 9 folded to the rear surface of the reflective sheet 11.

This structure will be specifically described with reference to FIG. 2A to FIG. 2C and FIG. 3A and FIG. 3B. Each of FIG. 2A to FIG. 2C is a schematic plan view showing a rear surface structure of a conventional liquid crystal display device. FIG. 2A to FIG. 2C show states in which respective constituent members are assembled on a rear surface of the case 2 in a predetermined order. FIG. 3A and FIG. 3B are schematic views showing states where a cross section along a III-III line as shown in FIG. 2C is viewed from a direction (from left side of FIG. 2C) indicated by arrows.

First, as shown in FIG. 2A and FIG. 3A, the reflective sheet 11 is bonded and fixed to two opposed sides of the rear surface of the case 2 through the two double-faced adhesive tapes 16. Next, the FPC 9 of the liquid crystal panel 8 is folded to the rear surface of the fixed reflective sheet 11. Then, an external connection end side of the FPC 9 is fixed to the case 2 through an FPC fixing double-faced adhesive tape 10 (FIG. 2B). Finally, the EMI protection sheet 12 such as an aluminum (Al) sheet is bonded to the entire rear surface of the reflective sheet 11 (FIG. 2C). For EMI protection, it is necessary to bond the EMI protection sheet 12 to at least a region covering a folded portion of the FPC 9. In FIG. 2A to FIG. 2C, a next ending direction of the external connection end side of the FPC 9 is reverse to that shown in FIG. 1.

The FPC 9 is flexibly formed so as to be folded. However, there is some degree of restoring force, so the folded FPC 9 tries to restore its original shape with the lapse of time. On the other hand, the reflective sheet 11 is formed of a metal sheet having a foil shape or a thin plate shape, so the reflective sheet 11 is easily deformed by the application of force. Therefore, as shown in FIG. 3B, when a restoring force as shown by an arrow B acts on the FPC 9 with the lapse of time, the EMI protection sheet 12 is pressed and deformed by the FPC 9.

The reflective sheet 11 is bonded to the EMI protection sheet 12 by a region of the FPC 9 other than the folded portion thereof. Therefore, when the EMI protection sheet 12 deforms, the reflective sheet 11 deforms to protrude from the rear surface of the light guide plate 3. As a result, light outputted from the rear surface of the light guide plate 3 cannot be uniformly reflected on the reflective sheet 11, which raises a problem in that the intensity of the backlight varies to cause display unevenness.

In order to solve this problem, it is expected to use a method of providing a thick reflecting plate having some degree of rigidity instead of the thin reflective sheet 11. It is also expected that the case 2 has a structure in which side surfaces and a rear surface of the backlight unit 51 are surrounded to fix the FPC 2 to the rear surface of the case 2. However, when the methods are used, weights and thicknesses with respect to the reflection plate and the case increase, so that reductions in weight and thickness of the liquid crystal display device cannot be realized.

SUMMARY OF THE INVENTION

The present invention has been made in view of the above-mentioned problems.

An object of the present invention is to provide a backlight unit capable of preventing deformation of a reflective sheet which is caused by an FPC located on a rear surface side of the backlight unit to suppress display unevenness, a display device provided with the backlight unit, and a method of manufacturing the display device.

The present invention provides a backlight unit, including: a case having a frame shape; a light guide plate fixed to the case; a light source located on the side of the light guide plate; a reflective sheet located on the rear of the light guide plate; an EMI protection sheet for covering at least a flexible board located on the rear of the reflective sheet; and a protective sheet located between the reflective sheet and the flexible board, for preventing deformation of the reflective sheet, wherein the EMI protection sheet is bonded to the flexible board and the protective sheet, whereby the flexible board is fixed to the protective sheet.

Further, the present invention provides a display device, including: a backlight unit; and a display panel which is connected with a flexible board and located on the front of the backlight unit, wherein the backlight unit includes: a case having a frame shape; a light guide plate fixed to the case; a light source located on the side of the light guide plate; a reflective sheet located on the rear of the light guide plate; a protective sheet located to cover the reflective sheet, for preventing deformation of the reflective sheet; and an EMI protection sheet for covering the flexible board folded to the rear of the protective sheet and at least apart of the protective sheet, wherein the EMI protection sheet is bonded to the flexible board and the protective sheet.

Further, the present invention provides a method of manufacturing a display device in which a display panel connected with a flexible board is located on the front of a backlight unit, including: a reflective sheet fixing step of locating a reflective sheet on the rear of a light guide plate fixed to a frame-shaped case of the backlight unit and fixing the located reflective sheet to the frame-shaped case; a protective sheet fixing step of locating and fixing a protective sheet for preventing deformation of the reflective sheet to cover the reflective sheet; a step of folding the flexible board toward the rear of the backlight unit and locating the folded flexible board on the rear of the protective sheet; and a step of bonding an EMI protection sheet to the folded flexible board and at least a part of the protective sheet to cover the folded flexible board and the part of the protective sheet.

According to the present invention, the deformation of the reflective sheet which is caused by the FPC located on the rear surface side of the backlight unit can be prevented to suppress display unevenness. This is because a protective sheet for reflective sheet deformation prevention is located on a rear surface of the reflective sheet and the FPC folded to the rear surface side of the backlight unit is fixed to the protective sheet. Therefore, even when a restoring force acts on the folded FPC, only the protective sheet deforms and the reflective sheet does not deform. Thus, light outputted from the rear surface of a light guide plate can be uniformly and continuously reflected on the reflective sheet.

BRIEF DESCRIPTION OF THE DRAWINGS

The above and other exemplary aspects, features and advantages of the present invention will become more apparent from the following detailed description when taken in conjunction with the accompanying drawings wherein:

FIG. 2A, FIG. 2B, and FIG. 2C are each a schematic plan view showing a rear surface structure of a conventional liquid crystal display device;

FIG. 5A, FIG. 5B, FIG. 5C, and FIG. 5D are each a schematic plan view showing a rear surface structure of the liquid crystal display device according to the first exemplary embodiment of the present invention;

DETAILED DESCRIPTION OF THE EXEMPLARY EMBODIMENTS

Exemplary embodiments of the present invention will now be described in detail in accordance with the accompanying drawings.

According to the present invention, in a structure in which a flexible printed circuit (FPC) board of a display panel is folded to a rear surface side of a backlight unit and located thereon, a protective sheet for preventing deformation of a reflective sheet is located between the reflective sheet and the folded FPC, and the FPC is fixed to the protective sheet through an EMI protection sheet. Therefore, the deformation of the FPC is absorbed by the protective sheet for reflective sheet deformation prevention without hindering reductions in weight and thickness of a liquid crystal display device, thereby preventing the deformation of the reflective sheet.

<First Exemplary Embodiment>

Figure 1:
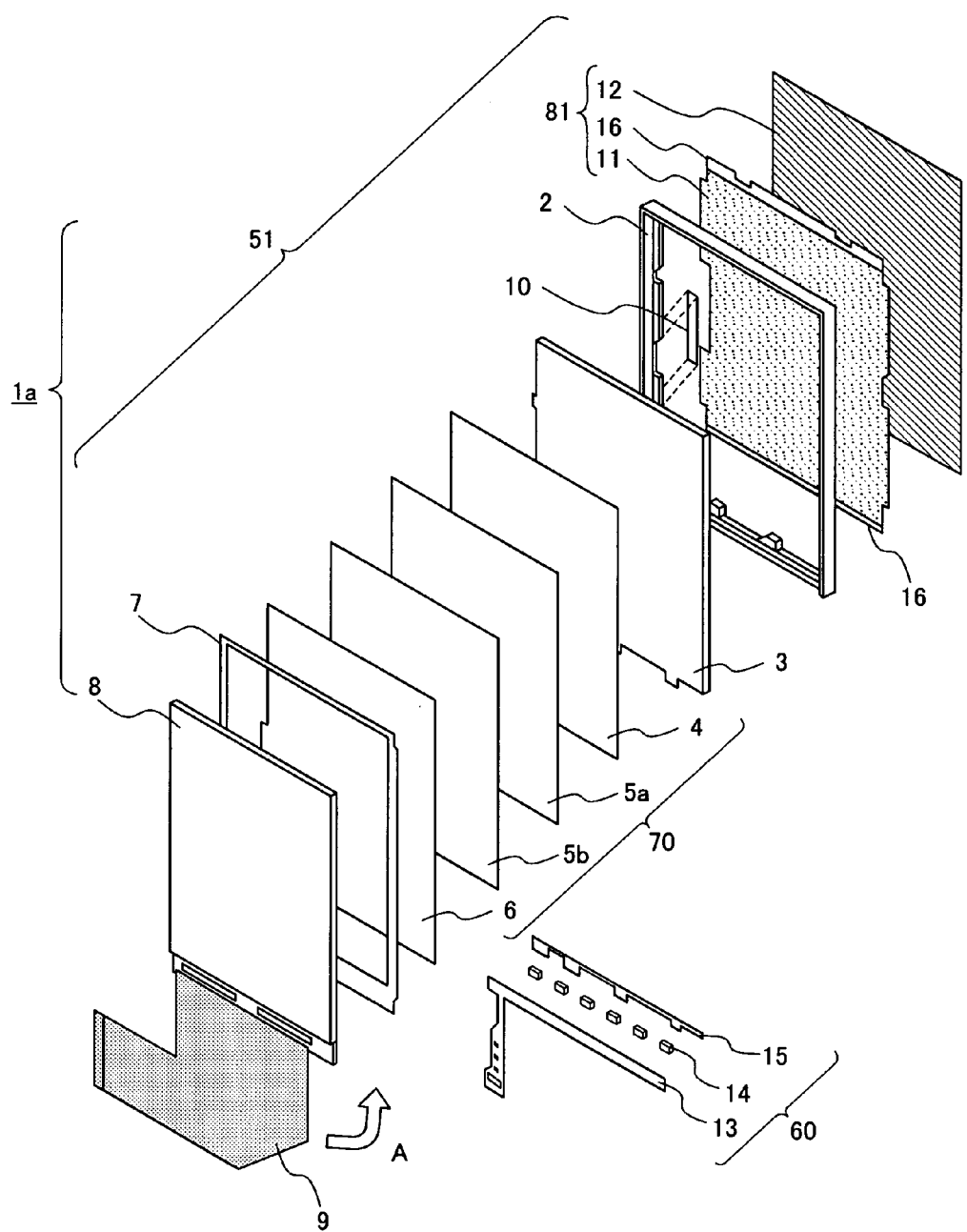
FIG. 1 is a perspective view showing a conventional liquid crystal display device disassembled into respective constituent parts.
Figure 3A:
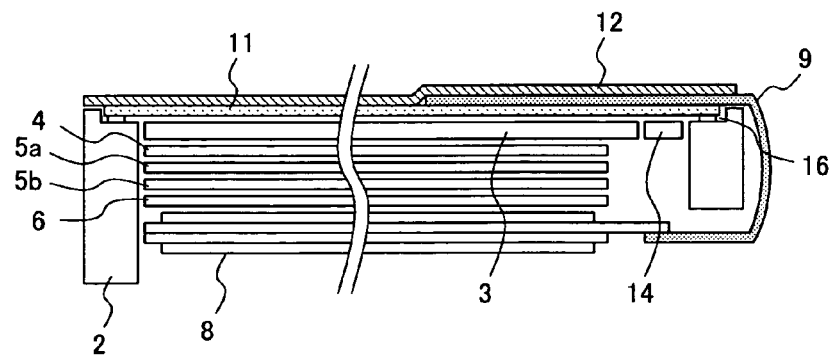
FIG. 3A and FIG. 3B are schematic views showing states where a cross section along a III-III line shown in FIG. 2C is viewed from a direction indicated by arrows.
Figure 3B:
Figure 3B:
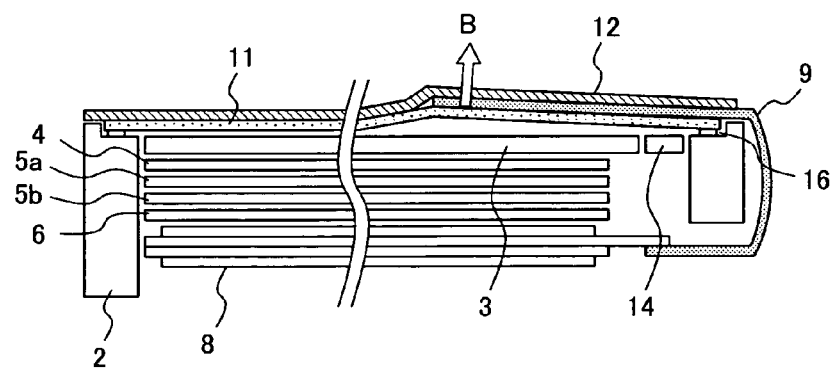
Figure 4:
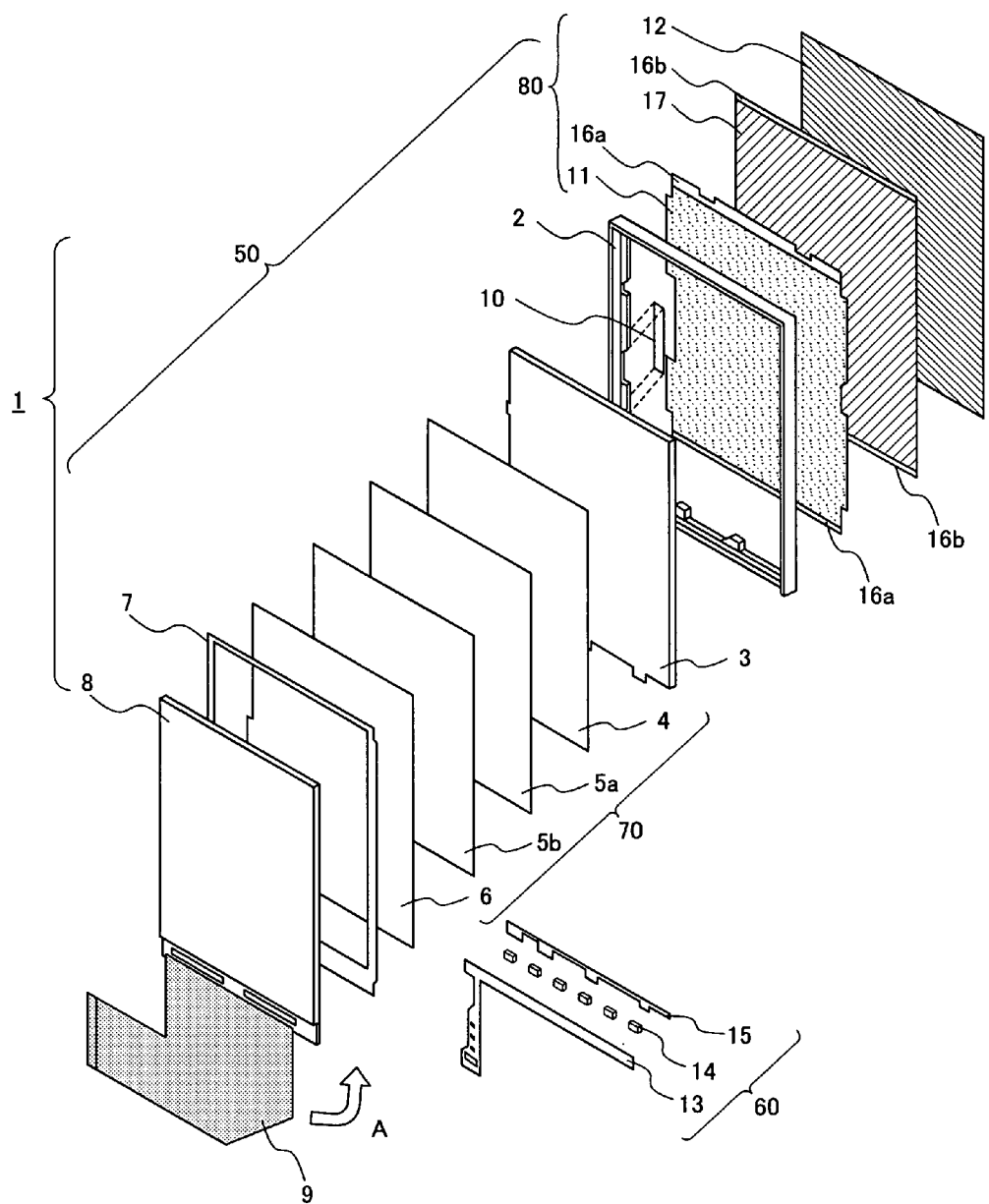
FIG. 4 is a perspective view showing a liquid crystal display device according to a first exemplary embodiment of the present invention, which is disassembled into respective constituent parts.
Figure 6A:
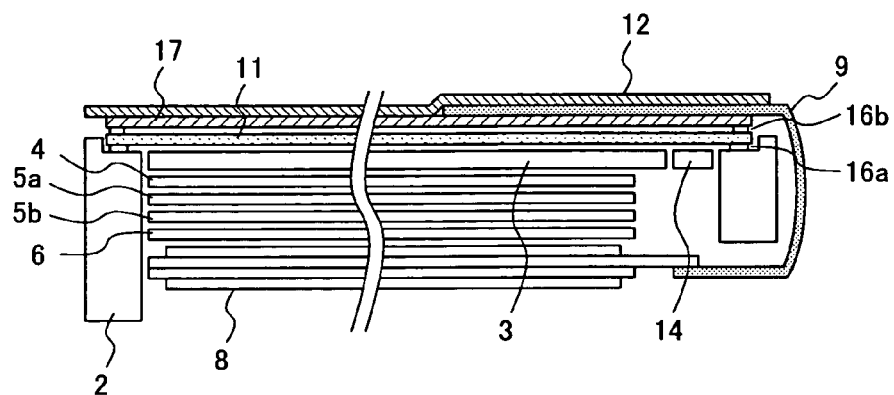
FIG. 6A and FIG. 6B are schematic views showing states where a cross section along a VI-VI line shown in FIG. 5D is viewed from a direction indicated by arrows.
Figure 6B:
Figure 6B:
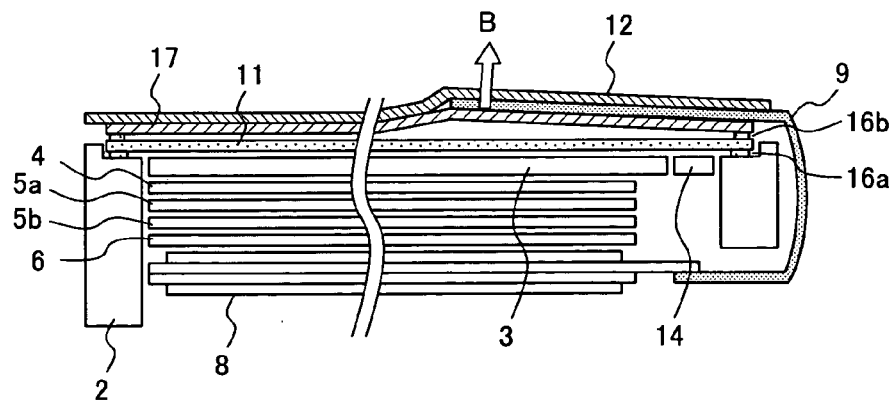

A first exemplary embodiment of the present invention will be described. FIG. 4 is a perspective view showing a liquid crystal display device according to the first exemplary embodiment of the present invention, which is disassembled into respective constituent parts. FIG. 5A, FIG. 5B, FIG. 5C, and FIG. 5D are each a schematic plan view showing a rear surface structure of the liquid crystal display device according to the first exemplary embodiment of the present invention. FIG. 6A and FIG. 6B are schematic views showing states where a cross section along a VI-VI line shown in FIG. 5D is viewed from a direction indicated by arrows.

As shown in FIG. 4, a liquid crystal display device 1 includes a liquid crystal panel 8 serving as a display panel and a backlight unit 50 of an edge light type for emitting backlight to the liquid crystal panel 8, which are principal constituent elements.

The liquid crystal panel (display panel) 8 includes a first board in which a switching element such as a thin film transistor (TFT) is formed in each of pixels arranged in matrix, a second board in which a color filter, a black matrix, and the like are formed, and a liquid crystal layer sandwiched between the first board and the second board. The first board is provided with an FPC 9 connected with an external circuit board such as a control circuit board for controlling the liquid crystal panel 8.

When the liquid crystal panel 8 is bonded to the backlight unit 50 through a double-faced adhesive tape 7 to assemble the liquid crystal display device 1, as shown by an arrow A, the FPC 9 is folded to a rear surface side (surface opposed to a display surface) of the backlight unit 50. It is to be noted here that a connecting means in which circuits and wirings are formed on a flexible base is collectively referred to as the FPC. The liquid crystal panel 8 is not limited to the structure, the shape, and the drive system which are described above. Therefore, the present invention can be applied to any type of display panel which is provided with the FPC 9 to be connected.

The backlight unit 50 includes a case 2, a light guide plate 3, a light source member 60, an optical member 70, and a reflecting member 80. The case 2 has a frame shape to hold and fix the respective constituent members. The light source member 60 is composed of light sources 14 such as LEDs, an FPC 13 on which a control circuit for the light sources 14 is formed, and a double-faced adhesive tape 15 for fixing the light sources 14 and the FPC 13. The light source member 60 is located on aside surface of the light guide plate 3. The light guide plate 3 is fixed in the frame of the case 2 to guide light generated from the light source member 60.

The optical member 70 is located on a surface side (liquid crystal panel 8 side) of the light guide plate 3 to convert light from the light guide plate 3 into uniform light and to irradiate the liquid crystal panel 8 with the uniform light. The optical member 70 is composed of a diffusing sheet 4, a first lens sheet 5a, a second lens sheet 5b, and a polarizing sheet 6.

The diffusing sheet 4 diffuses light outputted from the light guide plate 3 to the liquid crystal panel 8. The first lens sheet 5a and the second lens sheet 5b focus the diffused light on each pixel of the liquid crystal panel 8. The polarizing sheet 6 polarizes the focused light.

A reflecting member 80 is located on a rear surface side (side opposed to the liquid crystal panel 8) of the light guide plate 3 to reflect light outputted from the rear surface of the light guide plate 3, thereby returning the light to the light guide plate 3. The reflecting member 80 is composed of a reflective sheet 11, a protective sheet 17, an EMI protection sheet 12, and double-faced adhesive tapes 16a and 16b for fixation.

The reflective sheet 11 reflects, to the light guide plate 3, light outputted from the rear surface of the light guide plate 3. The protective sheet 17 is a thin sheet for preventing the deformation of the reflective sheet 11, which is the feature of the present invention. The EMI protection sheet 12 is a sheet for covering the FPC 9 folded to a rear surface of the protective sheet 17.

The feature of the present invention is that the structure (reflecting member 80) is provided on the rear surface side of the backlight unit 50. For example, structures of other portions (such as the light guide plate 3, the light source member 60, the optical member 70, and the liquid crystal panel 8) and an arrangement thereof are arbitrary. It is possible to locate a plurality of diffusing sheets 4 or use a single lens sheet instead of using a plurality of lens sheets. The present invention can be applied to an edge light type backlight unit in general. For example, rod-shaped lamps can be used as the light sources 14 or the light sources 14 can be located on two opposed sides of the light guide plate 3.

An assembly order of the reflecting member 80 in the structure provided on the rear surface side of the backlight unit 50 will be described with reference to FIG. 5A to FIG. 5D and FIG. 6A and FIG. 6B. Each of FIG. 5A to FIG. 5D is the schematic plan view showing the rear surface structure of the liquid crystal display device according to the first exemplary embodiment of the present invention. FIG. 6A and FIG. 6B are the schematic views showing states where the cross section along the VI-VI line as shown in FIG. 5D is viewed from the direction (from left side of FIG. 5D) indicated by the arrows.

As shown in FIG. 5A to FIG. 5D and FIG. 6A, the reflective sheet 11 is fixed to the case 2 through the double-faced adhesive tapes 16a. provided on two opposed sides of the rear surface of the case 2 on the rear surface side of the backlight unit 50 (FIG. 6A and FIG. 5A). Next, the protective sheet 17 for reflective sheet deformation prevention is fixed to the reflective sheet 11 through the double-faced adhesive tapes 16b provided on two opposed sides of the rear surface of the reflective sheet 11 (FIG. 6A and FIG. 5B). It is to be noted here that the reflective sheet 11 and the protective sheet 17 are bonded to each other through the double-faced adhesive tapes 16b at only two side ends (upper and lower ends as shown in FIG. 5A) and thus both the sheets are not bonded to each other at the entire surfaces. As is apparent from FIG. 6A, bonding positions (bonding regions) of the double-faced adhesive tapes 16a substantially coincide with those of the double-faced adhesive tapes 16b, so that the bonding regions of the double-faced adhesive tapes 16a overlap with those of the double-faced adhesive tapes 16b.

Next, a portion (extended portion in the lateral direction) of the FPC 9 folded from the liquid crystal panel 8 is fixed to a rear surface of the frame of the case 2 through a double-faced adhesive tape 10 for FPC fixation which is provided on the rear surface of the case 2 (FIG. 5C). Then, the EMI protection sheet 12 is bonded onto the entire surface of the protective sheet 17 and the folded portion of the FPC 9. As a result, the FPC 9 is fixed to the protective sheet 17 through the EMI protection sheet 12 (FIG. 5D and FIG. 6A).

In the liquid crystal display device having the above-mentioned structure, the FPC 9 tries to restore its original shape with the lapse of time. Therefore, a rising force (stress) is caused in the portion that is folded to the rear surface side of the case 2.

However, in the liquid crystal display device 1 according to this embodiment, as shown in FIG. 6B, the FPC 9 is located on the rear surface of the protective sheet 17 and fixed to the protective sheet 17 by the EMI protection sheet 12. Therefore, even when the restoring force acts as shown by an arrow B, only the protective sheet 17 deforms to rise and the reflective sheet 11 does not deform. Therefore, even with the lapse of time, light outputted from the rear surface of the light guide plate 3 can be uniformly and continuously reflected on the reflective sheet 11. Thus, display unevenness caused by the deformation of the reflective sheet 11 in the conventional structure is suppressed.

When the folded portion of the FPC 9 is fixed to the case 2 at two sides, that is, one side connected with the external circuit board (right side in FIG. 5C) and another side of the liquid crystal panel 8 side (lower side in FIG. 5C), the deformation of the FPC 9 can be suppressed to some extent. However, even in this case, the stress acts on the folded portion of the FPC 9 because thermal expansion coefficients of the respective members are different from one another. Therefore, even when the FPC 9 is fixed to the case 2 at a plurality of positions, the deformation of the reflective sheet 11 can be prevented using the structure according to the present invention.

A material for each of the members is not limited to a specific material. For example, it is only necessary that the reflective sheet 11 be made of a material capable of reflecting with certainty light outputted from the rear surface of the light guide plate 3. An aluminum (Al) sheet or the like can be used. The protective sheet 17 for reflective sheet deformation prevention is bonded to the EMI protection sheet 12, with the result that the protective sheet 17 is connected with the FPC 9. Therefore, it is preferable that the protective sheet 17 be made of a material having some degree of strength. For example, it is possible to use an insulating material such as polyethylene terephthalate (PET) or a resin sheet, a metallic material having a sheet shape or a thin plate shape, or a combination of those. When reductions in weight and cost are to be achieved, the insulating material is preferable. On the other hand, when an electromagnetic shielding effect of the FPC 9 is to be improved, the metallic material is preferable. When the metallic material is used for the protective sheet 17, an insulating layer is formed on the FPC 9 side, so that an electrical short circuit between the FPC 9 and the protective sheet 17 can be prevented. The EMI protection sheet 12 can effectively protect the FPC 9 from an electromagnetic wave. Further, it is necessary that the EMI protection sheet 12 be made of a material capable of fixing the FPC 9 and the protective sheet 17. For example, it is possible to use an aluminum (Al) sheet (or tape) including a metal layer and a bonding (adhesive) layer.

The shapes shown in FIG. 4, FIG. 5A to FIG. 5D, FIG. 6A, and FIG. 6B are illustrative and thus the shapes of the respective members can be modified as appropriate. For example, in these drawings, the reflective sheet 11 and the protective sheet 17 have substantially the same size and the same shape. It is only necessary to form the reflective sheet 11 to be able to reflect with certainty the light outputted from the rear surface of the light guide plate 3. It is only necessary to form the protective sheet 17 for reflective sheet deformation prevention in at least a region overlapping with the folded portion of the FPC 9 and the EMI protection sheet 12.

Figure 7A:
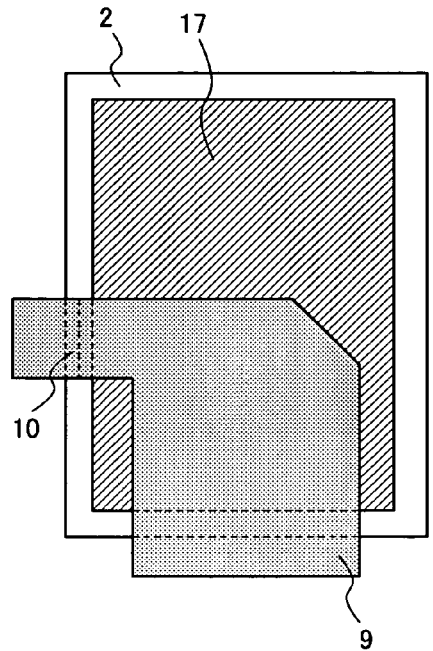
FIG. 7A, FIG. 7B, FIG. 7C, and FIG. 7D are each a plan view showing a variation of an FPC shape in the first exemplary embodiment of the present invention.
Figure 7B:
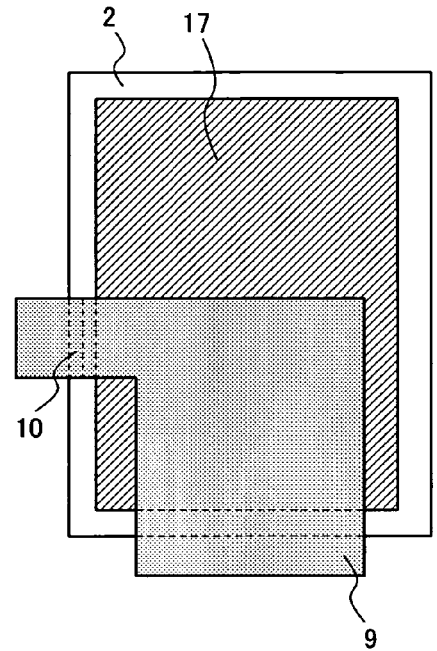
Figure 7C:
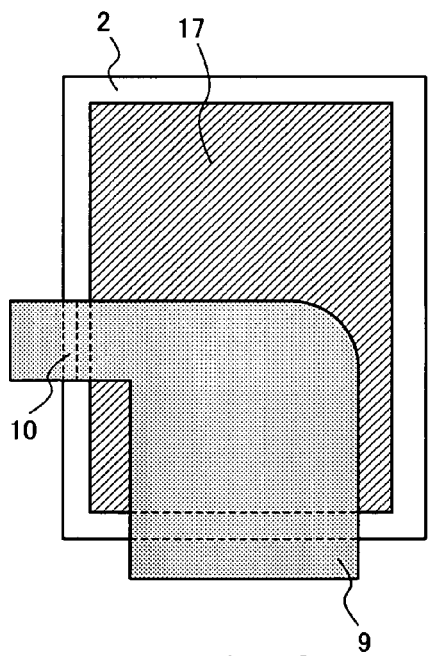
Figure 7D:
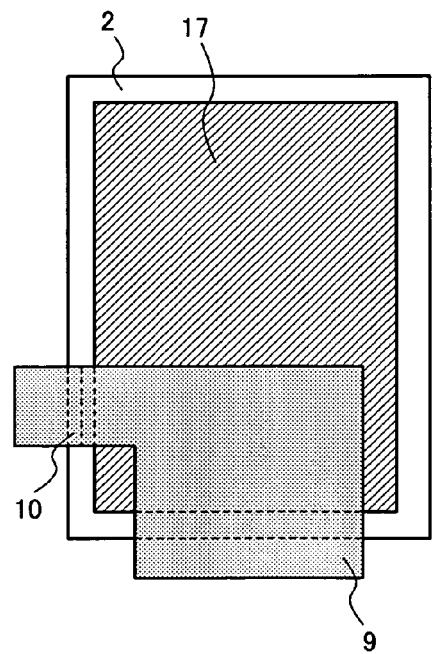

The shape of the FPC 9 is arbitrary and thus various variations can be made. For example, as shown in FIG. 7A, the FPC 9 whose portion is bent or extended to the left as viewed from the rear surface side of the case 2 may be used. As shown in FIG. 7B, the corner of the folded potion of the FPC 9 may be formed to be rectangular. As shown in FIG. 7C, the corner of the folded potion of the FPC 9 may be formed round. As shown in FIG. 7D, a size of the folded portion of the FPC 9 may be adjusted. In FIG. 5D, the EMI protection sheet 12 has a shape covering the entire rear surface of the case 2. However, it is only necessary that the EMI protection sheet 12 be formed to cover at least the folded portion of the FPC 9.

Methods of fixing and bonding the respective members can be modified as appropriate. For example, the reflective sheet 11 and the protective sheet 17 are fixed by the double-faced adhesive tapes 16a and 16b provided on the two opposed sides. However, positions of the double-faced adhesive tapes 16a and 16b to be provided may be changed or the double-faced adhesive tapes 16a and 16b may be provided on all sides of the rear surface of the case 2. When the protective sheet 17 is deformed by the restoring force of the FPC 9, in order to prevent the influence on the reflective sheet 11, it is preferable that the double-faced adhesive tapes 16a be provided to overlap with at least the double-faced adhesive tapes 16b as viewed from a direction normal (direction perpendicular) to the reflective sheet 11. When the external circuit board such as the control circuit board is connected with the FPC 9, the folded portion (i.e., a side connected to the external circuit board in this exemplary embodiment) of the FPC 9 is fixed to the case 2 by the double-faced adhesive tape 10 to prevent a load (stress) on the protective sheet 17. However, there is no need to fix the folded portion of the FPC 9 on the case 2. In the drawings, the double-faced adhesive tapes are used for methods of fixing the respective members, but fixing methods are arbitrary. Instead of the double-faced adhesive tape, for example, an adhesive material, a bonding agent, or the like may be used for fixation. Another mechanical fixing means may also be used.

Figure 8A:
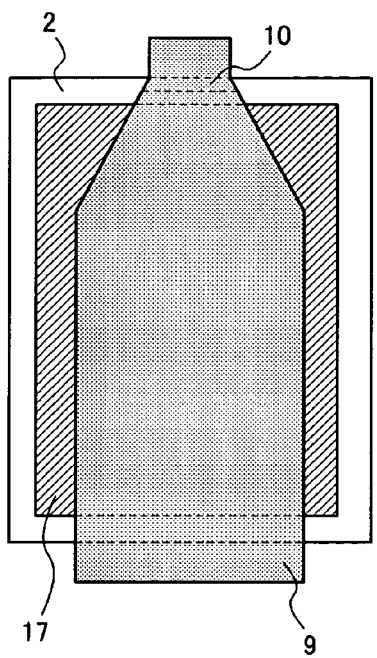
FIG. 8A, FIG. 8B, and FIG. 8C are each a plan view showing another variation of the FPC shape of the first exemplary embodiment of the present invention.
Figure 8B:
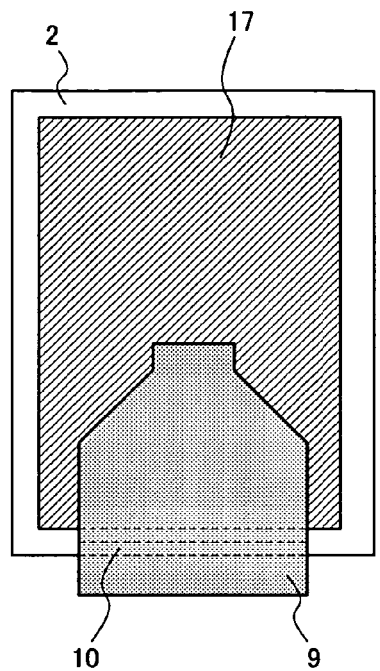
Figure 8C:
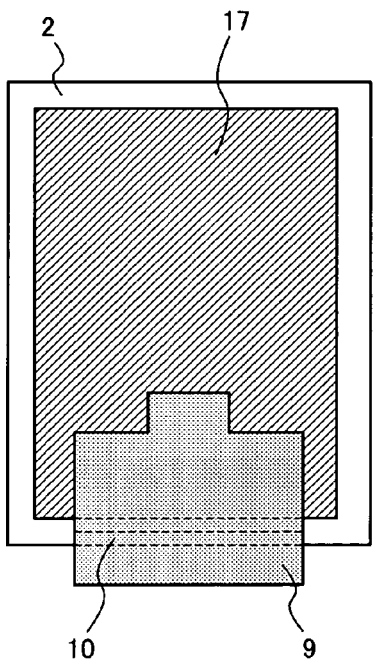

The above-mentioned description relates to the case where the external connection end portion of the FPC 9 is bent and protrudes in the lateral direction. However, the present invention is not limited to this case. For example, as shown in FIG. 8A, the FPC 9 may be formed to cross the opposed two sides of the case 2 without bending the FPC 9. As shown in FIG. 8B and FIG. 8C, even when an end portion of the FPC 9 on the side connected with the external circuit board is located in a region of the protective sheet 17, only the protective sheet 17 is deformed by the restoring force of the FPC 9 and the reflective sheet 11 does not deform. Therefore, the same effect is obtained in these cases shown in these drawings.

Figure 9A:
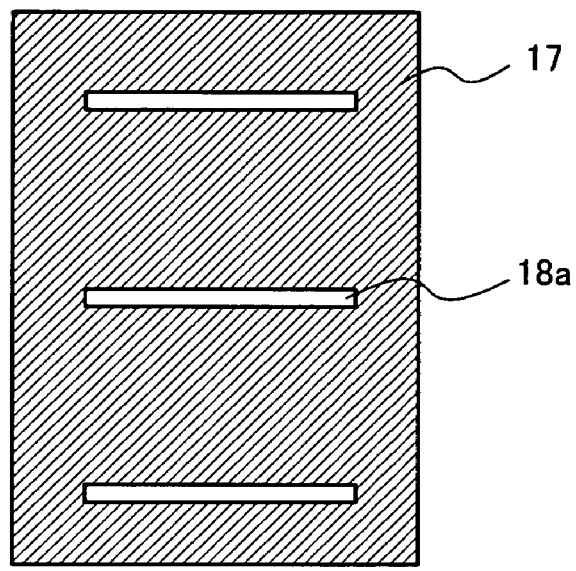
FIG. 9A and FIG. 9B are each a plan view showing a variation of a protective sheet shape for preventing deformation of a reflective sheet of the first exemplary embodiment of the present invention.
Figure 9B:
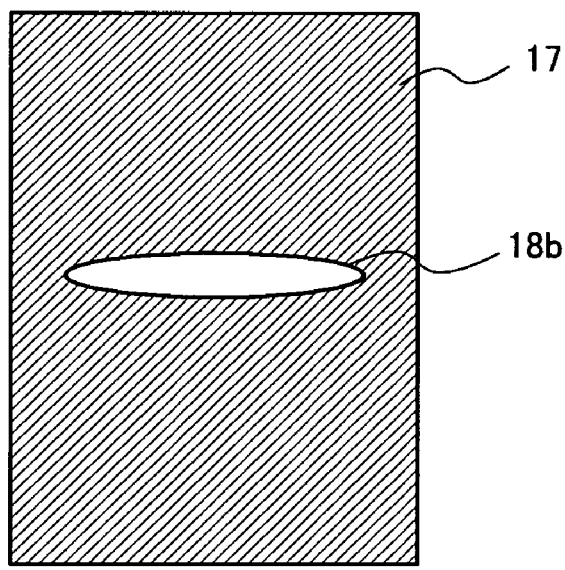

When the protective sheet 17 is easily deformed by the restoring force of the FPC 9, the restoring force can be absorbed by the protective sheet 17 to prevent the influence on the reflective sheet 11. In view of this aspect, for example, as shown in FIG. 9A, one or a plurality of slits 18a or holes may be provided in the protective sheet 17. A shape of each of the slits 18a, an arrangement thereof, and the like can be set as appropriate in view of a sheet deformation state. A shape other than a rectangular shape may be set. For example, as shown in FIG. 9B, an elliptical slit 18b may be provided. Further, the slits 18a and 18b can be formed in a longitudinal direction of FIG. 9A and FIG. 9B. A longitudinal slit and a lateral slit can be combined with each other. A bent-shaped slit can also be provided.

As described above, in the liquid crystal display device 1 according to this exemplary embodiment, the reflective sheet 11, the protective sheet 17, the FPC 9 folded from the liquid crystal panel 8, and the EMI protection sheet 12 are arranged in the stated order on the rear surface of the light guide plate 3 of the backlight unit 50. The FPC 9 and the protective sheet 17 are fixed by the EMI protection sheet 12. According to this structure, even when the restoring force acts on the FPC 9, the FPC 9 deforms only the protective sheet 17, so that the deformation of the reflective sheet 11 is suppressed. Therefore, even when the FPC 9 deforms, the light outputted from the rear surface of the light guide plate 3 can be uniformly reflected on the reflective sheet 11. Thus, a variation in intensity of the backlight can be eliminated to suppress the display unevenness.

<Second Exemplary Embodiment>

Next, a second exemplary embodiment of the present invention will be described. In the first exemplary embodiment described above, the protective sheet 17 is fixed to the reflective sheet 11 through the double-faced adhesive tapes 16b provided on the reflective sheet 11. In the case of this structure, it is necessary that the double-faced adhesive tapes 16b be provided to overlap with at least the double-faced adhesive tapes 16a as viewed from a direction normal (direction perpendicular) to the reflective sheet 11. If the double-faced adhesive tapes 16b are not provided as described above, the double-faced adhesive tapes 16b are likely to transfer the deformation of the protective sheet 17 to the reflective sheet 11. Therefore, a structure for minimizing the deformation of the protective sheet 17 which is transferred to the reflective sheet 11 is employed in this exemplary embodiment. That is, locating positions of the double-faced adhesive tapes 16b are adjusted. Other structures, arrangement, materials, and the like are identical to those in the first exemplary embodiment.

Figure 10A:
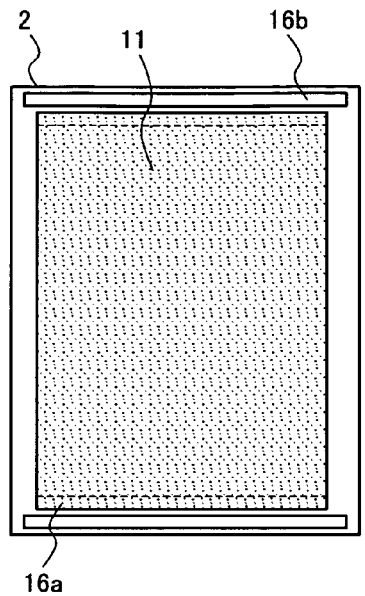
FIG. 10A, FIG. 10B, FIG. 10C, and FIG. 10D are each a schematic plan view showing a rear surface structure of a liquid crystal display device according to a second exemplary embodiment of the present invention.
Figure 10B:
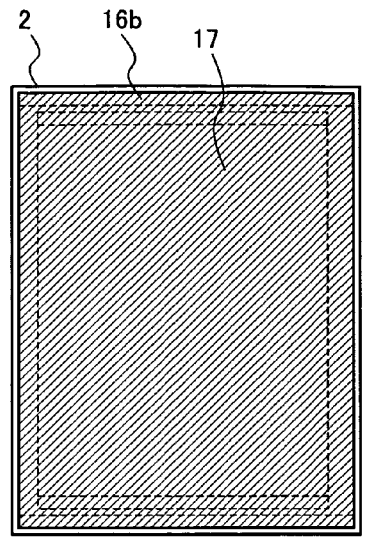
Figure 10C:
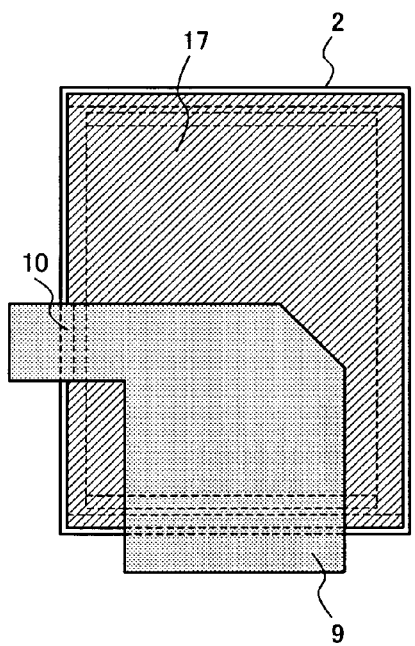
Figure 10D:
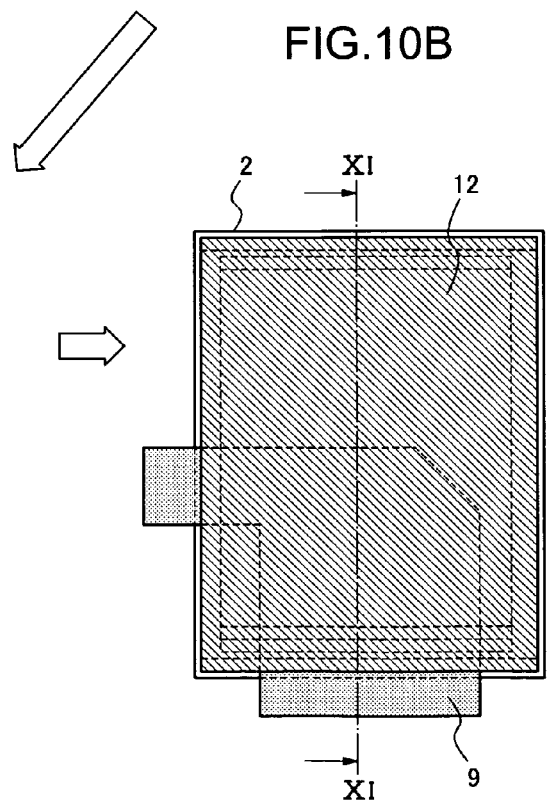
Figure 11A:
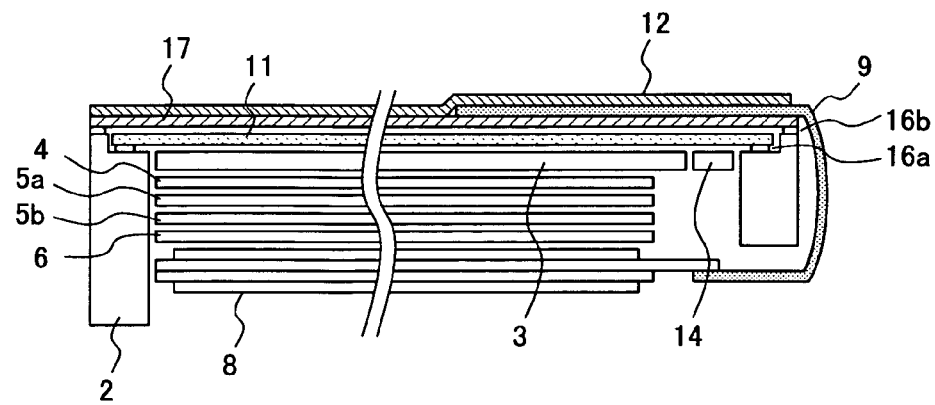
FIG. 11A and FIG. 11B are schematic views showing states where a cross section taken along a XI-XI line shown in FIG. 10D is viewed from a direction indicated by arrows.
Figure 11B:
Figure 11B:
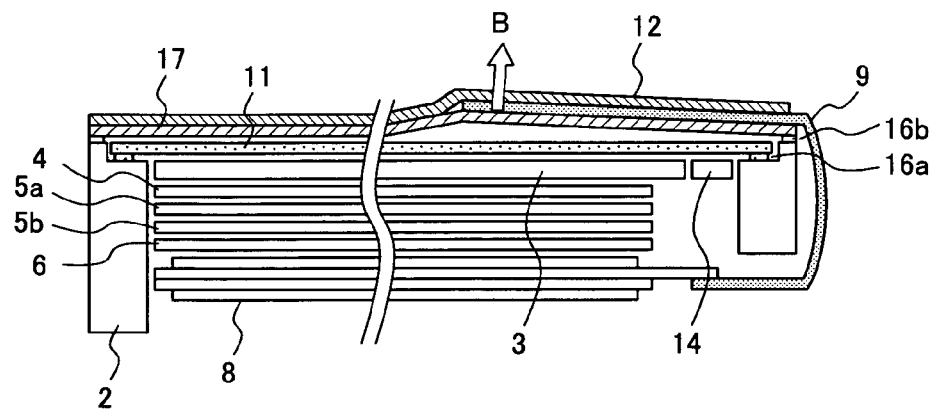

FIG. 10A, FIG. 10B, FIG. 10C, and FIG. 10D are each a schematic plan view showing a rear surface structure of a liquid crystal display device according to the second exemplary embodiment of the present invention. FIG. 11A and FIG. 11B are schematic views showing states where a cross section along a XI-XI line shown in FIG. 10D is viewed from a direction (from left side of FIG. 10D) indicated by arrows.

As shown in FIG. 10A and FIG. 11A, the reflective sheet 11 is fixed to the case 2 through the double-faced adhesive tapes 16a provided on the rear surface of the case 2 on the rear surface side of the backlight unit 80. The process up to here is identical to that in the first exemplary embodiment. In the second exemplary embodiment, locating positions of the double-faced adhesive tapes 16b are changed. The double-faced adhesive tapes 16b are provided not on the end sides of the reflective sheet 11 but on the rear surface of the case 2 outside the reflective sheet 11 (FIG. 10A). Next, the protective sheet 17 is fixed to the case 2 through the double-faced adhesive tapes 16b located on a rear surface of the frame of the case 2 (FIG. 10B and FIG. 11A). Next, a portion of the FPC 9 folded from the liquid crystal panel 8 is fixed to the case 2 through the double-faced adhesive tape 10 for FPC fixation which is provided in a portion (left side in FIG. 10C) of the rear surface of the case 2 (FIG. 10C) Next, the EMI protection sheet 12 is bonded and fixed to the protective sheet 17 and the folded FPC 9 to cover the protective sheet 17 and the folded FPC 9 (FIG. 10D). In FIG. 10A to FIG. 10D, the extending direction of the external connection end side of the FPC 9 is reverse to that shown in FIG. 4.

In this exemplary embodiment, the protective sheet 17 is directly fixed to the case 2, so the reflective sheet 11 and the protective sheet 17 are not bonded and fixed to each other at all. Therefore, as shown in FIG. 11B, even when the restoring force (arrow B) acts on the FPC 9, only the protective sheet 17 is deformed to rise. Therefore, there is completely no influence on the reflective sheet 11.

In this embodiment, it is necessary to cover the rear surface of the frame shape of the case 2 with the protective sheet 17, so a size of the protective sheet 17 is slightly larger than that in the first exemplary embodiment. The locating positions of the double-faced adhesive tapes 16b are not limited to the above-mentioned positions and thus can be adjusted as long as the locating positions are on the rear surface of the case 2. As described in the first exemplary embodiment, even when other fixing and bonding method and means are employed, the same effect is expected for the double-faced adhesive tapes 16b. As mentioned in the first exemplary embodiment, the shape, the material, a fixing method, the slit provided in the protective sheet can be changed for each of the members. The protective sheet 17 is formed to completely cover the reflective sheet 11. Therefore, when a material having light reflectivity, such as metal, is used for the protective sheet 17, light which is outputted from the light guide plate 3 and leaks from the surrounding of the reflective sheet 11 can, be reflected on the protective sheet 17.

In the above-mentioned respective exemplary embodiments, the case where the FPC 9 connected with the liquid crystal panel 8 is folded to the rear surface side of the backlight unit is described. However, the present invention is not limited to this case and thus can be applied to an arbitrary structure in which flexible circuit boards or flexible members which may deform the reflective sheet 11 are located on the rear surface side of the backlight unit in the same way.

While this invention has been described in connection with certain preferred embodiments, it is to be understood that the subject matter encompassed by way of this invention is not to be limited to those specific embodiments. On the contrary, it is intended for the subject matter of the invention to include all alternative, modification, and equivalents as can be included within the spirit and scope of the following claims.

Further, it is the inventor's intention to retain all equivalents of the claimed invention even if the claims are amended during prosecution.

What is claimed is:

1. A backlight unit, comprising:
   a case having a frame shape;
   a light guide plate fixed to the case;
   a light source located on the side of the light guide plate;
   a reflective sheet located on the rear of the light guide plate;
   an EMI protection sheet for covering at least a flexible board located on the rear surface of the reflective sheet; and
   a protective sheet located between the reflective sheet and the flexible board, for preventing deformation of the reflective sheet,
   wherein the EMI protection sheet is bonded to the flexible board and the protective sheet, whereby the flexible board is fixed to the protective sheet.

2. The backlight unit according to claim 1, wherein:
   the reflective sheet is fixed to a rear surface of the case;

the protective sheet is fixed to a side edge of a rear surface of the reflective sheet; and the protective sheet is deformed by deformation of the flexible board.

3. The backlight unit according to claim 2, wherein a fixing region between the protective sheet and the reflective sheet overlaps with at least a fixing region between the reflective sheet and the case.

4. The backlight unit according to claim 1, wherein:

the reflective sheet is fixed to a rear surface of the case;

the protective sheet is fixed to the rear surface of the case which is located outside the reflective sheet; and the protective sheet is deformed by deformation of the flexible board.

5. The backlight unit according to claim 1, wherein a part of the flexible board is fixed to a rear surface of the case.

6. The backlight unit according to claim 1, wherein the protective sheet comprises an insulating material.

7. The backlight unit according to claim 1, wherein the protective sheet comprises a conductive material layer provided on a reflective sheet side and an insulating material layer provided on a flexible board side.

8. The backlight unit according to claim 1, wherein the protective sheet includes at least one slit formed therein.

9. The backlight unit according to claim 8, wherein the slit is rectangular.

10. The backlight unit according to claim 8, wherein the slit is elliptical.

11. A display device, comprising:

a display panel; and the backlight unit according to claim 1, which is attached to the display panel.

12. The display device according to claim 11, wherein:

the display panel comprises a liquid crystal display panel;

the flexible board comprises a first end connected with the liquid crystal display panel and a second end folded toward a rear surface side of the backlight unit.

13. A display device, comprising:

a backlight unit; and a display panel which is connected with a flexible board and located on the front of the backlight unit, wherein the backlight unit includes:

a case having a frame shape;

a light guide plate fixed to the case;

a light source located on the side of the light guide plate;

a reflective sheet located on the rear of the light guide plate;

a protective sheet located to cover the reflective sheet, for preventing deformation of the reflective sheet; and an EMI protection sheet for covering the flexible board folded to the rear of the protective sheet and at least a part of the protective sheet, wherein the EMI protection sheet is bonded to the flexible board and the protective sheet.

14. The display device according to claim 13, wherein:

the reflective sheet is fixed to a rear surface of the case;

the protective sheet is fixed to an edge of a rear surface of the reflective sheet; and the EMI protection sheet and the protective sheet are deformed by stress acting on the folded flexible board.

15. The display device according to claim 13, wherein:

the reflective sheet is fixed to a rear surface of the case;

the protective sheet is fixed to the rear surface of the case which is located outside the reflective sheet; and the EMI protection sheet and the protective sheet are deformed by stress acting on the folded flexible board.

16. A method of manufacturing a display device in which a display panel connected with a flexible board is located on the front of a backlight unit, comprising:

a reflective sheet fixing step of locating a reflective sheet on the rear of a light guide plate fixed to a frame-shaped case of the backlight unit and fixing the located reflective sheet to the frame-shaped case;

a protective sheet fixing step of locating and fixing a protective sheet for preventing deformation of the reflective sheet to cover the reflective sheet;

a step of folding the flexible board toward the rear of the backlight unit and locating the folded flexible board on a rear surface of the protective sheet; and a step of bonding an EMI protection sheet to the folded flexible board and at least a part of the protective sheet to cover the folded flexible board and the part of the protective sheet.

17. The method according to claim 16, wherein:

the reflective sheet is fixed to a rear surface of the frame-shaped case in the reflective sheet fixing step; and the protective sheet is fixed to an edge of a rear surface of the reflective sheet in the protective sheet fixing step.

18. The method according to claim 16, wherein:

the reflective sheet is fixed to a rear surface of the frame-shaped case in the reflective sheet fixing step; and the protective sheet is fixed to the rear surface of the frame-shaped case which is located outside the reflective sheet in the protective sheet fixing step.

* * * * *